3,330,622
PROCESS FOR DEHYDRATING ALUMINUM SULFATE
Walter C. Saeman, Orange, Conn., assignor to Olin Mathieson Chemical Corporation, a corporation of Virginia
No Drawing. Filed June 28, 1963, Ser. No. 291,239
7 Claims. (Cl. 23—123)

The present invention relates to a novel process for dehydrating hydrated aluminum sulfate. More particularly, the present invention relates to a process for making dehydrated aluminum sulfate for use in the preparation of alumina of high purity from hydrated, crystalline aluminum sulfate.

Hydrated aluminum sulfate may be prepared by digesting clay with sulfuric acid. The material, still containing impurities derived from the clay, is used commercially in the hydrated form. Dehydration is, therefore, neither necessary nor advantageous since the commercial aluminum sulfate must be redissolved in water prior to its utilization.

If aluminum sulfate is, however, utilized as an intermediate compound from which to produce alumina, then the hydrated, crystalline material must be both dehydrated and decomposed to obtain alumina suitable for the electrolytic reduction process.

Numerous processes have been devised for obtaining substantially iron free aluminum sulfate from iron bearing clays. A particularly suitable process is described in co-pending application Ser. No. 116,069, filed June 9, 1961, by Walter C. Saeman, now U.S. Patent 3,143,392. This patent application teaches the recovery by crysallization of pure hydrated aluminum sulfate from an impure solution of clay and sulfuric acid. Other methods for recovering purified hydrated crystals of aluminum sulfate are described in United States Patents 2,951,753 and 2,958,580.

Irrespective of the particular process used for the preparation of substantially iron free aluminum sulfate, these processes generally have as their aim the preparation of crystallized aluminum sulfate for decomposition into alumina and sulfur dioxide.

The crystallized aluminum sulfate thus prepared ordinarily contains up to 18 moles of water per mole of $Al_2(SO_4)_3$ and generally from 16 to 18 moles of water. In the usual operation, this hydrated aluminum sulfate is heated to remove the water of crystallization prior to decomposition into alumina and sulfur dioxide.

The water of hydration begins to evolve slowly at a temperature above 200° F. and the dehydration is completed at temperatures above 400° F. The decomposition of the dehydrated aluminum sulfate into alumina, sulfur dioxide and sulfur trioxide proceeds in the temperature range of 1300–1700° F. Since hydrated aluminum sulfate melts near 186° F., difficulty is often encountered in attaining a suitable drying rate without encountering fusion of the solid.

An additional and particularly acute problem has been observed in this dehydration step. When dehydration is effected in accordance with usual procedure, i.e., heated at an elevated temperature, there occurs a substantial and objectionable amount of particle size degradation by dusting. Some of this dust is lost in the dryer flue gases, thereby entailing a loss of valuable product from the process. In addition, the dust emission necessitates the use of special dust collecting equipment to permit partial recovery of the dust. Elimination of the dusting is, therefore, a highly desirable objective which would reduce plant equipment costs, improve product recovery and eliminate potential atmospheric pollution.

Accordingly, it is a principal object of the present invention to provide an improved process for the dehydration of aluminum sulfate.

It is a further and particular object of the present invention to devise a process for dehydration of aluminum sulfate without objectionable particle size degradation by dusting.

It is a still further object of the present invention to provide a new and improved process as aforesaid which is simple, expedient and particularly suited for a commercial operation.

It is an additional object of the present invention to provide a process as aforesaid which attains a suitable drying rate without encountering fusion of the solid.

Further objects and advantages of the present invention will appear hereinafter.

In accordance with the present invention it has now been found that a novel process for dehydrating aluminum sulfate has been devised which accomplishes the foregoing objects and advantages. The process of the present invention comprises heating hydrated aluminum sulfate in the presence of from 2 to 12 percent sulfuric acid wherein the temperature is maintained below the fusion temperature of said aluminum sulfate. The heating is commenced at a temperature below 186° F. and the temperature is preferably progressively increased, while still being maintained below the said fusion temperature.

It has been surprisingly and unexpectedly found that aluminum sulfate dehydrated in accordance with the simple and expedient process of the present invention completely overcomes the aforementioned disadvantages and especially overcomes the disadvantages of dust and particle size degradation. The process of the present invention is admirably suited for commercial operation since it introduces no new constituent into the process, i.e., sulfuric acid is used in conventional processes for the preparation of alumina. In addition, the present invention attains a simplified operation since no dust collector is required on the dryer. Still further, product recovery is improved since there is no dust loss.

The present invention comprises heating at an elevated temperature hydrated aluminum sulfate in the presence of a specific amount of sulfuric acid. The particular temperature of heating may vary within a wide range. The commencement temperature is not especially critical and the heating may commence at any convenient temperature, even room temperature if desired. Naturally, however, in order to obtain practical drying rates, the higher temperatures just below fusion temperature are preferred.

The normal hydrated aluminum sulfate has the formula $Al_2(SO_4)_3 \cdot (16-18)H_2O$. This composition has a melting point of 186° F. If this composition is to be treated without fusion the initial drying temperature must therefore be started below 186° F. Heated aluminum sulfate will gradually lose its water of crystallization. As the water content of the crystal decreases the fusion temperature of the crystal increases. The drying temperature is therefore preferably progressively increased.

It has been found practical and is preferred to commence drying hydrated aluminum sulfate crystal by progressive heating of the crystal up to 300° F. over a period of one hour, for example, progressive heating from 180° F. to 300° F. During this time the water content of the crystal drops from about 48 percent to less than 25 percent. Once the residual water content of the crystals reaches a value less than 25 percent, the aluminum sulfate becomes relatively insensitive to fusion allowing the use of final temperatures in the range of 400 to 500° F. to complete the dehydration. Further increases in temperature will then result in volatilization of the excess sulfuric acid which may then be recovered for reuse in the process.

In the broad embodiment, therefore, the hydrated aluminum sulfate containing excess sulfuric acid is heated at a temperature maintained below the fusion temperature of the aluminum sulfate, preferably until the crystal is dehydrated. In the preferred embodiment the temperature is gradually increased as water is driven off and maintained sufficiently below the fusion temperature to avoid accidental fusion and agglomeration of the particulate bed.

The time of heating is not especially critical and heat may be maintained at the elevated temperature for as long as desired to obtain the particular degree of dehydration needed for the given operation. The rate of drying and rate of temperature rise is dependent upon the particle size of the aluminum sulfate. A rate of rise of 2° F. per minute starting at 180° F. has been found to be suitable for 10 to 20 mesh aluminum sulfate crystals. Drying rates for larger or smaller size crystals will vary approximately inversely with the particle size.

In the process of the present invention the hydrated aluminum sulfate is simply heated in contact with from 2 to 12 percent sulfuric acid. It has been found in accordance with the present invention that optimum results have been attained utilizing from 5 to 7 percent $H_2SO_4$, while beneficial results are obtained over the entire operable range, however.

The aluminum sulfate is preferably heated in a current of inert gas in order to remove the vapor and avoid recondensation thereof. Any inert gas may be employed, for example, flue gas, air, nitrogen, etc. In addition, in the preferred embodiment a moving bed of hydrated aluminum sulfate is heated, for example, heating in a rotary dryer.

The process of the present invention is especially useful in the preparation of alumina from aluminiferrous ores. In this event, the dehydrated aluminum sulfate is further decomposed to yield the desired alumina ($Al_2O_3$) and to permit the regeneration of sulfuric acid from the evolved sulfur dioxide and sulfur trioxide. The excess sulfuric acid associated with the hydrated crystal feed to suppress dusting is recovered easily and simply with the remaining sulfur dioxide and sulfur trioxide evolved during the decomposition of the aluminum sulfate. In this respect, the process of the present invention obtains significant advantages in the overall process for refining alumina from aluminiferrous ores using sulfuric acid as a reagent. It should be noted, however, that the process is highly useful wherever it is desired to dehydrate hydrated aluminum sulfate, quite apart from the preferred utilization of this process in an overall process of producing refined alumina from aluminiferrous ores.

The process of the present invention will be more readily apparent from a consideration of the following illustrative examples.

EXAMPLE 1

200 grams of 12 mesh, granular, $Al_2(SO_4)_3 \cdot (16-18)H_2O$ containing no excess sulfuric acid was placed in an 8-inch I.D. rotary dryer. The temperature was raised progressively from 185° F. to 300° F. in one hour. There was a continuous evolution of sulfate dust from the dryer amounting to 50 percent of the total feed. Final moisture of the dried recovered product was 25 percent.

EXAMPLE 2

200 grams of plus 20-mesh crystallized $Al_2(SO_4)_3 \cdot (16-18)H_2O$ containing 6 percent excess sulfuric acid were placed in an 8-inch I.D. rotary dryer. The temperature was raised progressively from 185° F. to 300° F. in one hour. There was no dust in evidence during the drying operation. Final moisture of the recovered product was 26 percent.

EXAMPLE 3

200 grams of plus 20-mesh crystallized $Al_2(SO_4)_3 \cdot (16-18)H_2O$ containing 6 percent excess sulfuric acid was placed in an 8-inch I.D. rotary dryer. The temperature was raised progressively from 185° F. to 400° F. over a period of 2 hours. There was no dust in evidence during the drying operation. Final moisture of the recovered product was 19 percent $H_2O$.

This invention may be embodied in other forms or carried out in other ways without departing from the spirit or essential characteristics thereof. The present embodiment is therefore to be considered as in all respects illustrative and not restrictive, the scope of the invention being indicated by the appended claims and all changes which come within the meaning and range of equivalency are intended to be embraced therein.

What is claimed is:

1. A process for dehydrating aluminum sulfate which comprises heating hydrated aluminum sulfate in the presence of from 2 to 12 percent sulfuric acid at a temperature maintained below the fusion temperature of said aluminum sulfate, said heating being commenced at a temperature below 186° F.

2. A process according to claim 1 wherein said temperature is progressively increased while being maintained below said fusion temperature.

3. A process according to claim 2 wherein the heating is conducted in a current of inert gas.

4. A process for dehydrating aluminum sulfate which comprises heating a moving bed of hydrated aluminum sulfate in a current of inert gas and in the presence of from 2 to 12 percent sulfuric acid, wherein the temperature is maintained below the fusion temperature of said aluminum sulfate, said heating being commenced at a temperature below 186° F.

5. A process according to claim 4 wherein said temperature is progressively increased while being maintained below said fusion temperature.

6. A process according to claim 5 wherein said aluminum sulfate is in granular form.

7. A process according to claim 5 wherein from 5 to 7 percent of sulfuric acid is employed.

References Cited

UNITED STATES PATENTS

| | | | |
|---|---|---|---|
| 769,534 | 9/1904 | Cummer | 23—123 |
| 1,489,362 | 4/1924 | Moxham | 23— 123 X |

FOREIGN PATENTS

| | | |
|---|---|---|
| 506,034 | 5/1937 | Great Britain. |

OSCAR R. VERTIZ, *Primary Examiner.*

EARL C. THOMAS, *Examiner.*